United States Patent
Bathen et al.

(10) Patent No.: US 10,541,886 B2
(45) Date of Patent: Jan. 21, 2020

(54) DECENTRALIZED CHANGE MANAGEMENT BASED ON PEER DEVICES USING A BLOCKCHAIN

(71) Applicant: International Business Machines Corporation, Armonk, NY (US)

(72) Inventors: Luis Angel D. Bathen, Placentia, CA (US); Gabor Madl, Santa Clara, CA (US); Ramani R. Routray, San Jose, CA (US); Mu Qiao, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 15/603,503

(22) Filed: May 24, 2017

(65) Prior Publication Data

US 2018/0343175 A1    Nov. 29, 2018

(51) Int. Cl.
*H04L 12/24* (2006.01)
*H04L 29/08* (2006.01)
*G06F 16/22* (2019.01)

(52) U.S. Cl.
CPC ...... *H04L 41/5019* (2013.01); *G06F 16/2255* (2019.01); *H04L 67/10* (2013.01)

(58) Field of Classification Search
CPC ............. H04L 2209/38; H04L 2209/56; H04L 9/3236; H04L 41/0813; G06F 16/27
See application file for complete search history.

(56) References Cited

U.S. PATENT DOCUMENTS

| | | | |
|---|---|---|---|
| 10,225,208 B1 * | 3/2019 | Prahlad | H04L 41/0869 |
| 2016/0028552 A1 | 1/2016 | Spanos et al. | |
| 2016/0261690 A1 | 9/2016 | Ford | |
| 2016/0275461 A1 | 9/2016 | Sprague et al. | |
| 2017/0048234 A1 * | 2/2017 | Lohe | G06Q 20/065 |
| 2017/0048235 A1 | 2/2017 | Lohe et al. | |
| 2017/0132619 A1 * | 5/2017 | Miller | G06Q 20/3829 |
| 2017/0236123 A1 * | 8/2017 | Ali | G06O 20/401 |
| | | | 705/75 |
| 2017/0279774 A1 * | 9/2017 | Booz | G06F 16/24568 |
| 2017/0337534 A1 * | 11/2017 | Goeringer | H04L 9/3239 |
| 2018/0039667 A1 * | 2/2018 | Pierce | G06Q 20/0658 |
| 2018/0115538 A1 * | 4/2018 | Blake | H04L 63/10 |
| 2018/0117447 A1 * | 5/2018 | Tran | G06Q 20/00 |
| 2018/0123882 A1 * | 5/2018 | Anderson | H04L 41/0813 |
| 2018/0167198 A1 * | 6/2018 | Muller | G06F 21/16 |

(Continued)

OTHER PUBLICATIONS

Anonymously, System and Method for Software Asset Management Powered by Blockchain and Smart Contracts, ip.com, Oct. 24, 2016.

(Continued)

*Primary Examiner* — Arvin Eskandarnia

(57) ABSTRACT

A blockchain of transactions may be referenced for various purposes and may be later accessed by interested parties for ledger verification and information retrieval. One example method of operation may include one or more of monitoring a computing service via various nodes operating on a blockchain, identifying a proposed change to the computing service, storing details of the proposed change in a smart contract, storing the smart contract as a transaction in the blockchain, and validating the proposed change of the smart contract.

20 Claims, 7 Drawing Sheets

(56) References Cited

U.S. PATENT DOCUMENTS

2018/0232413 A1* 8/2018 Eshwar ............. G06F 17/30377
2019/0013943 A1* 1/2019 Maim ........................ H04L 9/14
2019/0057382 A1* 2/2019 Wright ............... G06Q 20/3827

OTHER PUBLICATIONS

Anonymously, Mechanism to Preserve Audit History Record for Insurance Claim using Blockchain Smart Contract, ip.com, Aug. 5, 2016.
Anonymously, Universal Blockchained Health Record, ip.com, Apr. 13, 2016.
Snyder, D., Blockchain Technolgy for the Internet of Things, Google, Jan. 2017.

* cited by examiner

450

470

DECENTRALIZED CHANGE MANAGEMENT BASED ON PEER DEVICES USING A BLOCKCHAIN

TECHNICAL FIELD

This application generally relates to using a blockchain to provide support for peer device monitoring, and more particularly, to decentralized change management based on peer devices using a blockchain.

BACKGROUND

The blockchain may be used as a public ledger to store any type of information. Although, primarily used for financial transactions, the blockchain can store any type of information including assets (i.e., products, packages, services, status, etc.). The blockchain may be used to securely store any type of information in its immutable ledger. Any information may be stored in the immutable ledger.

Large-scale change management in the enterprise may require standardized methods and procedures be used for efficient management of all changes, in order to minimize the impact of change-related incidents and to optimize day-to-day operations. For example, large data centers have complex information technology (IT) infrastructures, usually with hundreds of thousands of servers, network devices, uninterruptible power sources (UPS), and other devices, which may be spread across the globe. Given such a huge number of IT assets, certain changes can be happening inside a data center, such as patching an operating system, updating a firmware, and upgrading a server, etc. These changes may have an impact on various data center operations. It is estimated that 80% of the outages in a data center are due to a previously implemented 'change' and 80% of the mean-time-to-repair (MTTR) is trying to identify the source of those errors. In another example, enterprises are deploying more and more applications or services in the cloud due to its agility and elasticity. One cloud service may involve multiple players. For example, a running application can be managed by provider A, the compute and storage component managed by a different provider B, the network component managed by still another provider C, and the disaster recovery or backup service managed by yet still a further provider D. Given such a scenario, any end-to-end changes are complex and the involvement of multiple entities can significantly increase the downtime risk for businesses in general. The change made on one IT device may not be known to others or it should have been executed only after the changes on depending devices are completed. In addition, the change may not be authorized, completely falling out of the change management process.

SUMMARY

One example embodiment may include a method that includes one or more of monitoring a computing service via a plurality of nodes operating on a blockchain, identifying a proposed change to the computing service, storing details of the proposed change in a smart contract, storing the smart contract as a transaction in the blockchain, and validating the proposed change of the smart contract.

Another example embodiment may include an apparatus that includes a processor configured to perform one or more of monitor a computing service via a plurality of nodes operating on a blockchain, identify a proposed change to the computing service, store details of the proposed change in a smart contract, store the smart contract as a transaction in the blockchain, and validate the proposed change of the smart contract.

Still another example embodiment may include a non-transitory computer readable storage medium that stores instructions that when executed cause a processor to perform one or more of monitoring a computing service via a plurality of nodes operating on a blockchain, identifying a proposed change to the computing service, storing details of the proposed change in a smart contract, storing the smart contract as a transaction in the blockchain, and validating the proposed change of the smart contract.

DETAILED DESCRIPTION

Figure 1:
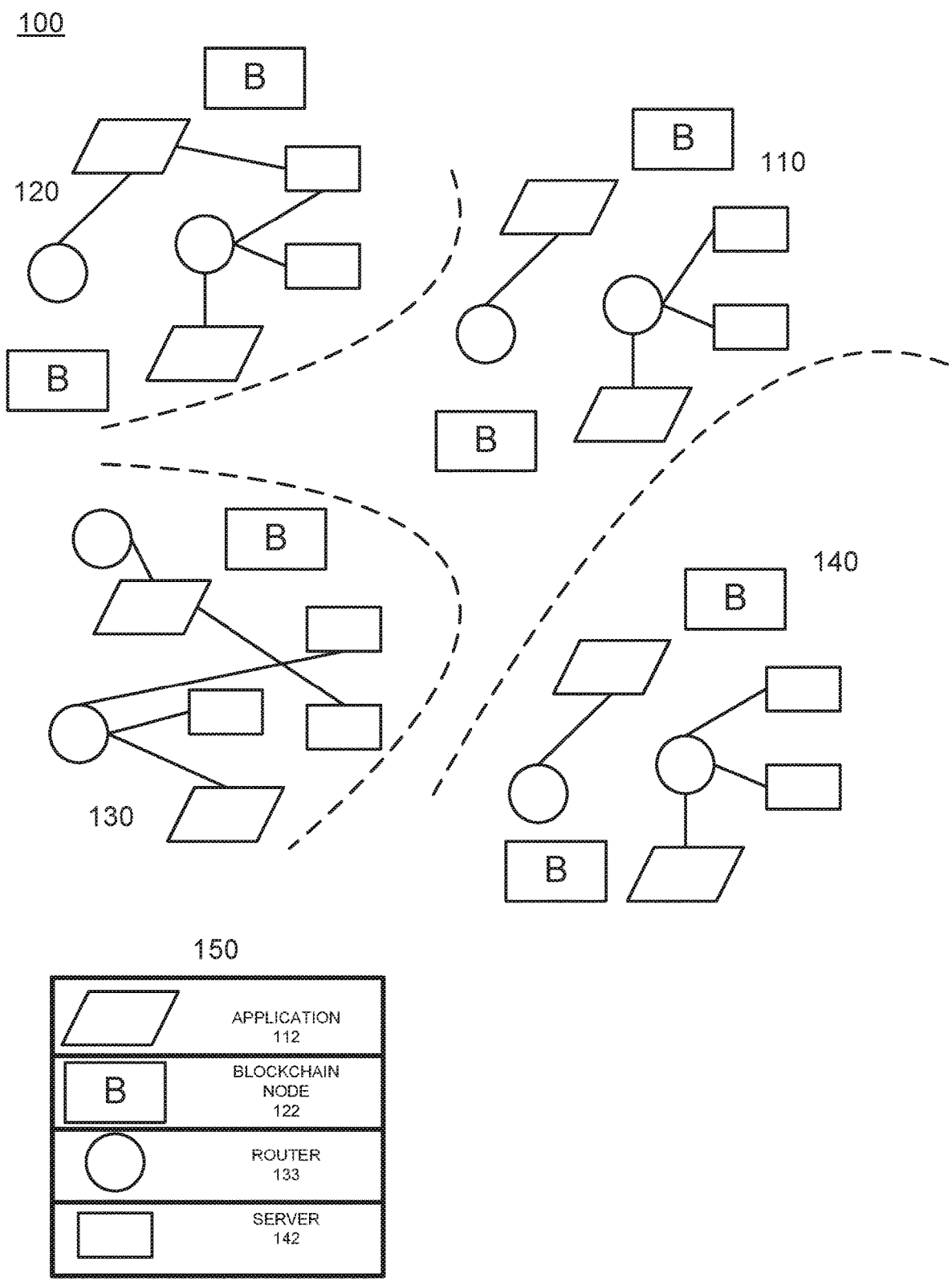
FIG. 1 illustrates a network of resources being segregated into sub-networks to be managed by blockchain peer nodes according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to using a blockchain to provide support for peer device monitoring, and in another embodiment relates to enabling peer devices to make optimal changes to requests/proposals which are being monitored via blockchain transactions.

Example embodiments include a system, device and/or a method to decentralize the change management process based on smart contract technology in a blockchain. The targeted management objects, such as complex cloud services or data center IT infrastructure may be modeled as a graph. The graph can be further divided into several subgraphs based on the graph structure, each of which is assigned a set of blockchain nodes to monitor. The management object is therefore managed by a network of blockchain nodes. In contrast to the traditional centralized change management, the application manages all the changes in a distributed trustless approach. A change proposal is constructed as a smart contract, involving all the associated parties including the change management authority, which approves/disapproves the proposal. The contract describes in detail the conditions under which the change will be executed and what to execute. The contract is published as a transaction, which is then validated and executed by mining nodes. The contracts and their execution results are stored in an off-chain distributed hash-table (or DHT) with the references stored in the blockchain, which are immutable and traceable. Therefore, no one can tamper or change records. Since all the changes are traceable through the blockchain, it can help the administrator go back to the point where a device or service failed and find out what kind of changes may cause the issue.

The process of change management may be decentralized based on a smart contract in a blockchain, which ensures that all the executed changes are authorized and the entire states are visible to the public. In addition, all the change records are immutable and secure. For any IT asset or service, all the changes that happened and other history is immutable and recorded, which assists with diagnosis. The change management may rely on a change and configuration management database (CCMDB), which stores the details of assets, their relationships, as well as records and tracks changes.

FIG. 1 illustrates a network of resources being segregated into sub-networks to be managed by blockchain peer nodes according to example embodiments. Referring to FIG. 1, the various network 100 sub-networks may be characterized by the availability of certain blockchain peer nodes which are available to monitor network resources and identify potential faults, changes necessary for optimization and implementation strategies. The sub-networks 110, 120, 130 and 140 may be samples 150 of various applications 112, nodes 122, routers 133, servers 142, firewalls and/or power distribution units (PDUs), which can be monitored and tracked by the blockchain nodes 122. Each blockchain node monitors the IT assets in the assigned sub-network which may be assigned based on a sub-graph of a graph of the entire network. The blockchain peer nodes may also perform monitoring of the change requests/proposals created by the client/service administrator.

If a change proposal is identified and collected, the blockchain node will construct a smart contract for that proposal, describing all the involved parties including the change management authority and depending assets, the conditions to execute, and what to execute. Specifically, the change management authority is in charge of approving the submitted change proposal. The change can only be executed after the authority approves the changes. In one example, the smart contract also includes additional conditions which may be related to depending assets. For example, the proposed change can only be executed after a change to its depending assets has been completed (e.g., a supporting operating system needs to be upgraded to a certain version prior to proceeding).

Examples of proposed changes may include software or hardware updates, such as upgrades to newer versions, data privacy compliance changes, such as adding a more stringent privacy compliance requirement to a data storage service, removing/adding a service, such as adding a data backup service, etc. A check may be performed to determine if the contract is already in the blockchain. If the contract exists and its execution result is "success", the change has already been successfully processed and stored. Otherwise, a new transaction is created with the contract. New transactions are broadcast to all nodes in the network. Although the blockchain nodes are dedicated to monitoring and collecting change proposals in their assigned sub-network, they can still work as a miner to add blocks to the blockchain. Each node collects new transactions into a block. The mining nodes will validate the transaction (i.e., the contract), check contract conditions, and execute the contract if conditions are met. The execution result can be the status of executing the change, such as, "success" or "failure". After a mining node validates and executes the contract, it broadcasts the block including the contract execution result to all nodes. Nodes may share their acceptance of the block by working on the creating of the next block in the blockchain using the hash of the accepted block as the previous hash for new blocks. Nodes always consider the longest chain to be the correct chain and will keep working on extending the chain. The blockchain may only store references to an off-chain distributed hash-table (or DHT) that stores the actual data related to the changes. Since there are a large number of blockchain nodes working independently and simultaneously, the entire infrastructure is monitored constantly and in real-time. Only authorized changes are executed. The entire contract status is visible to the public. All the stored changes are immutable, which prevents malicious record tempering. The changes for any asset are traceable through the blockchain.

Figure 2:
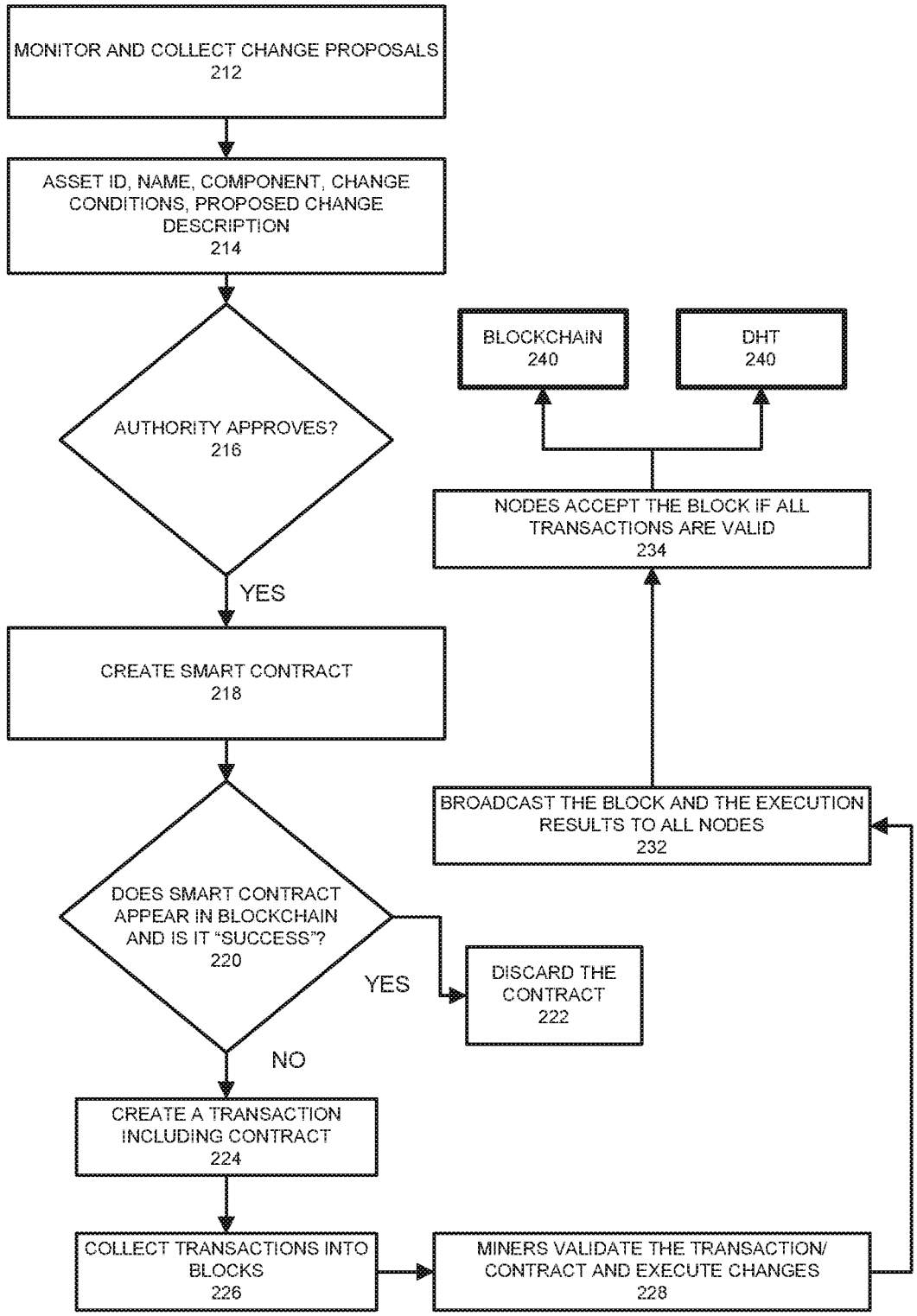
FIG. 2 illustrates an example flow diagram of a monitoring and smart contract proposal creating and executing procedure according to example embodiments.

FIG. 2 illustrates an example flow diagram of a monitoring and smart contract proposal creating and executing procedure according to example embodiments. Referring to FIG. 2, the flow diagram 200 includes initial operations for monitoring and proposed change management for one or more network enterprise resources. For instance, the monitoring and collecting of data may include identifying one or more items requiring change which can be placed in a list or file to be included in the "change proposal" 212. The information may include the device or asset ID, name, component, change conditions, proposed change description 214, a list of devices affected by the change, network name, sub-network name, etc. Examples of changes may include upgrades, software installs, modifications to the device statuses, commission of new devices, decommission of devices, cloud application porting, etc.

The information may be stored in a smart contract and logged in the blockchain ledger as a transaction. The authority responsible for reviewing the changes may vote, reach consensus or simply approve the changes 216 and the contract 218 may be created and logged in the blockchain 240. The contract may be stored in the blockchain and a decision 220 may determine if it is deemed a success 222 and then it can be discarded or no further changes are necessary. If not yet implemented, the transaction 224 may be created and collected as transactions 226 into blocks so miners can validate the transaction/contract and execute the changes 228. The block can be broadcasted along with results to all nodes in the blockchain 232 and a consensus may be reached if all transactions are valid 234. The blockchain may log certain parts of the smart contract, however, a distributed hash table (DHT) may be used to store results of the smart contract execution, such as changes and other subsequently processed information.

In operation, the IT infrastructure and/or cloud service can be divided into several components or sub-networks, each of which is assigned a set of blockchain nodes, so that the entire management effort is monitored by a network of blockchain nodes uniquely assigned to the various sub-networks associated with the particular blockchain nodes. A change proposal is constructed as a smart contract, which includes all the involved parties, conditions to execute, and what actions to execute. The smart contract is published as a transaction, which is automatically validated and executed. The contract and its execution results are stored in an off-chain distributed hash table (DHT). All the changes and related records are immutable and traceable.

One example approach is to model the entire data center or network infrastructure as a graph with each IT asset being represented as a node and the relationships (e.g., network connections, dependencies) represented as edges. The graph can be divided into several sub-graphs using existing graph partitioning or community detection operations, such as spectral clustering. In addition, the installed firewalls between different IT assets can also help determine how the infrastructure can be divided. A set of blockchain nodes are assigned to each sub-graph of the corresponding sub-network. The size of nodes varies with the size of the assigned sub-graph. The larger the sub-graph, the more nodes that are assigned. Each node monitors the IT assets and detects changes in the assigned sub-graph independently. The change management process is managed by distributed blockchain nodes.

Figure 3:
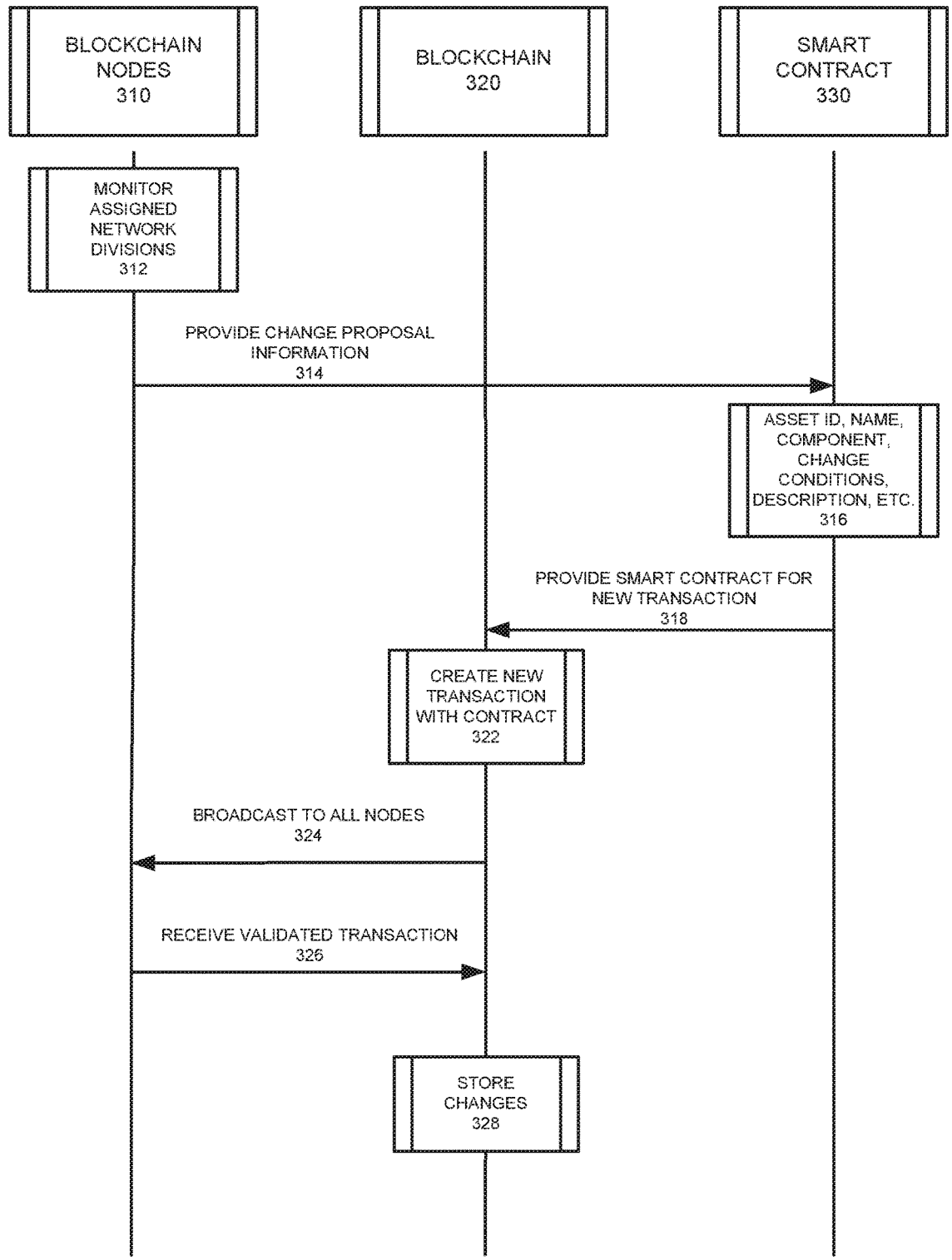
FIG. 3 illustrates a system signaling diagram of the interactions between a blockchain and peer nodes according to example embodiments.

FIG. 3 illustrates a system signaling diagram of the interactions between a blockchain and peer nodes according to example embodiments. Referring to FIG. 3, the configuration 300 includes the peer blockchain nodes 310, the blockchain 320 and a smart contract 330 which is created and stored in the blockchain 320. In operation, each of the blockchain nodes will monitor 312 their assigned network divisions, sub-networks, etc. The proposed and needed changes may be identified and provided 314 as suggestions to a smart contract 330 for execution. The smart contract 316 may be created to include all change information related to the changes and entities which are affected. A new transaction may be created based on the provided information 318 and placed in a smart contract transaction 322. All nodes available for review may receive a broadcast 324 including the proposed contract changes. The validated transaction 326 may be confirmed so the change included in the smart contract may be performed and finalized. All records of changes, proposed changes, new proposed changes, entities and related information may be stored 328 for recordation and access purposes.

Figure 4A:
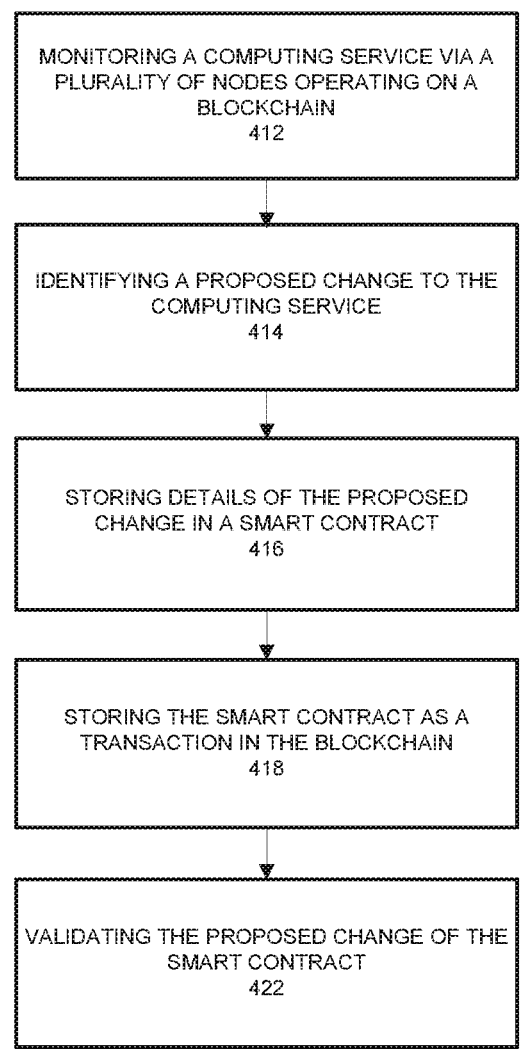
FIG. 4A illustrates a flow diagram of an example method of creating a change proposal for a network in the blockchain according to example embodiments.

FIG. 4A illustrates a flow diagram of an example method of creating a change proposal for a network in the blockchain according to example embodiments. Referring to FIG. 4A, the method 400 may include monitoring a computing service via a plurality of nodes operating on a blockchain 412, identifying a proposed change to the computing service 414, storing details of the proposed change in a smart contract 416, storing the smart contract as a transaction in the blockchain 418, and validating the proposed change of the smart contract 422. The computing service may be one or more of a cloud service, a network service, and a data center service. The details of the proposed change may include all parties involved in the proposed change, conditions required to execute the proposed change, and items to be executed during the proposed change. The method may also include executing the proposed change of the smart contract, and storing execution results of the smart contract in a distributed hash table that is separate from the blockchain and broadcasting the transaction to the plurality of nodes on the blockchain, and authorizing the proposed change via one or more of the plurality of nodes. The method may also include creating one or more blocks with execution results of the proposed change of the smart contract, and broadcasting the execution results to the plurality of nodes. The method may also include accepting the one or more blocks if the transaction is deemed valid.

Figure 4B:
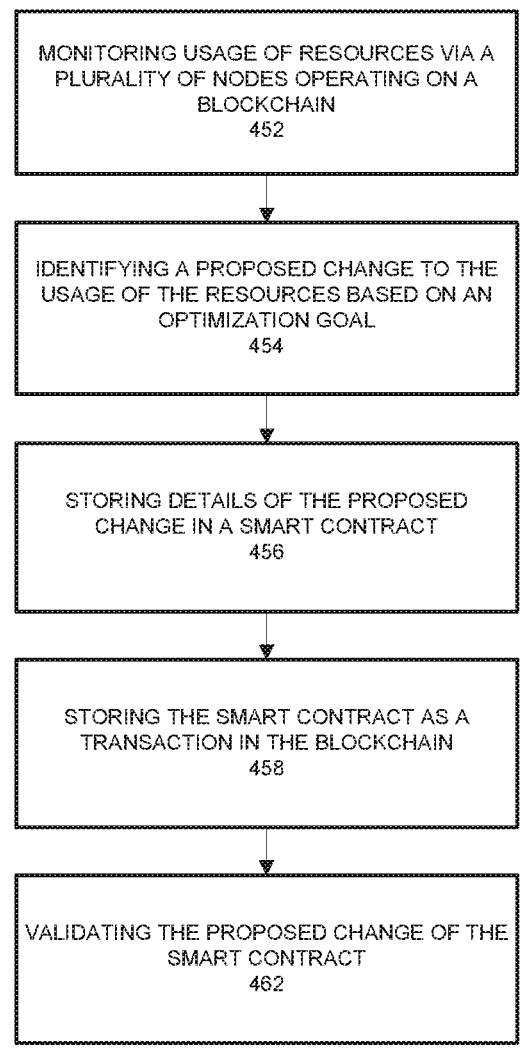
FIG. 4B illustrates another flow diagram of another example method of creating a change proposal for a network in the blockchain according to example embodiments.

FIG. 4B illustrates another flow diagram of another example method of creating a change proposal for a network in the blockchain according to example embodiments. This example method 450 may include monitoring usage of resources via a plurality of nodes operating on a blockchain 452, identifying a proposed change to the usage of the resources based on an optimization goal 454, storing details of the proposed change in a smart contract 456, storing the smart contract as a transaction in the blockchain 458, and validating the proposed change of the smart contract 462.

In addition to monitoring network computing resources, cloud resources, IT resources, etc., other common resources may be monitored for identifying optimal usage characteristics and goals. For example, an enterprise configuration may also use power, fuel, off-grid resources, which can be easily tracked via the Internet of things (IoT) or other common network communication protocols. The monitoring of such resources may lead to optimal changes, such as power switch control during non-business hours, consolidation of energy pricing, costs per unit, fuel etc. Those monitored resources and usage schedules may offer additional smart contract information that should be identified and proposed for improvement and optimization. All such proposed changes can be stored in the smart contracts in the blockchain and enacted upon a peer node approval process.

Figure 4C:
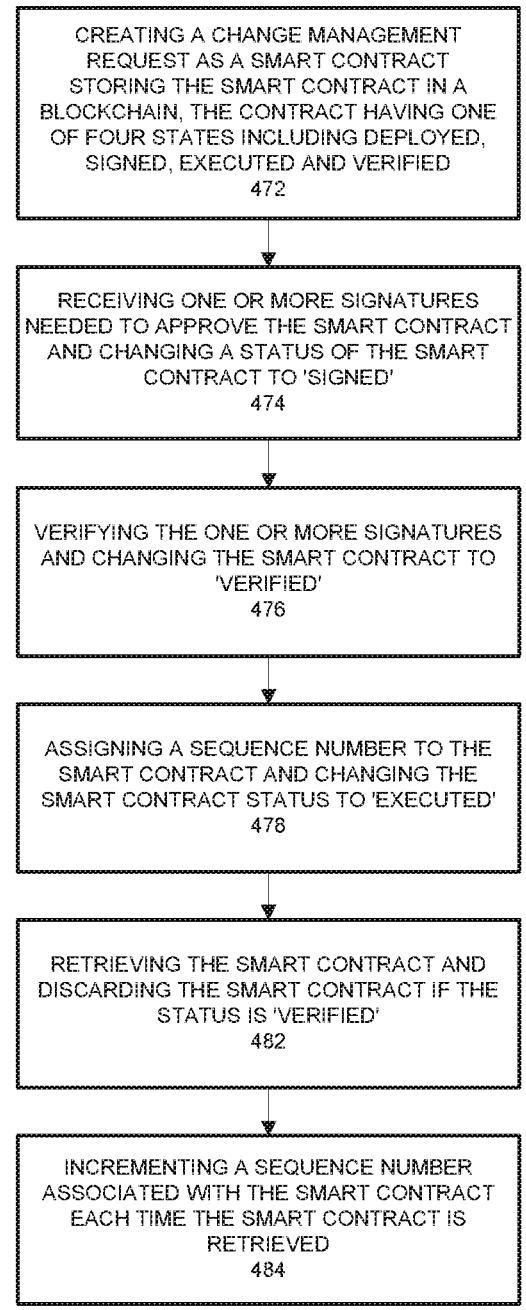
FIG. 4C illustrates another flow diagram of another example method of managing a smart contract in the blockchain according to example embodiments.

FIG. 4C illustrates another flow diagram 470 corresponding to another example embodiment. In this example, the client/administrator creates a change management request as a smart contract (i.e., chaincode) 472. The contract is signed by the administrator and deployed in the blockchain. The contract has four states, such as deployed, signed, executed with a sequence number, and verified. When a new contract is deployed, a peer node will execute the first step, which is gathering all signatures. The peer node will request the change management authority to approve (i.e., sign off) the contract, and the contract changes its status to 'signed' 474. The peer node will then verify the signature of the change manager, the client/administrator requesting the change, and execute it upon signature validation 476. The change is performed, and the peer signs the contract, and changes the status of the contract to executed with a sequence number used for retry purposes 478. Another peer node or verification node will retrieve the contract from the blockchain, and identify a status, if the status is verified, it will discard the contract 482, otherwise, it will continue the process (e.g., sign, execute, verify). The verifying node will verify the signatures of the administrator, the change manager, and the peer who executed the contract. It will then determine that the change did occur, if so, the contract will be signed and the status is changed to verified. Otherwise, the status is changed to execute, (sequence number plus '1') so the next time the contract is retrieved it will be executed 484. The sequence number is maintained to limit the number of re-tries. For example, after a set number of re-tries the account may be locked. All of the changes are logged on the blockchain.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent or be integrated in any of the above-described components, etc.

Figure 5:
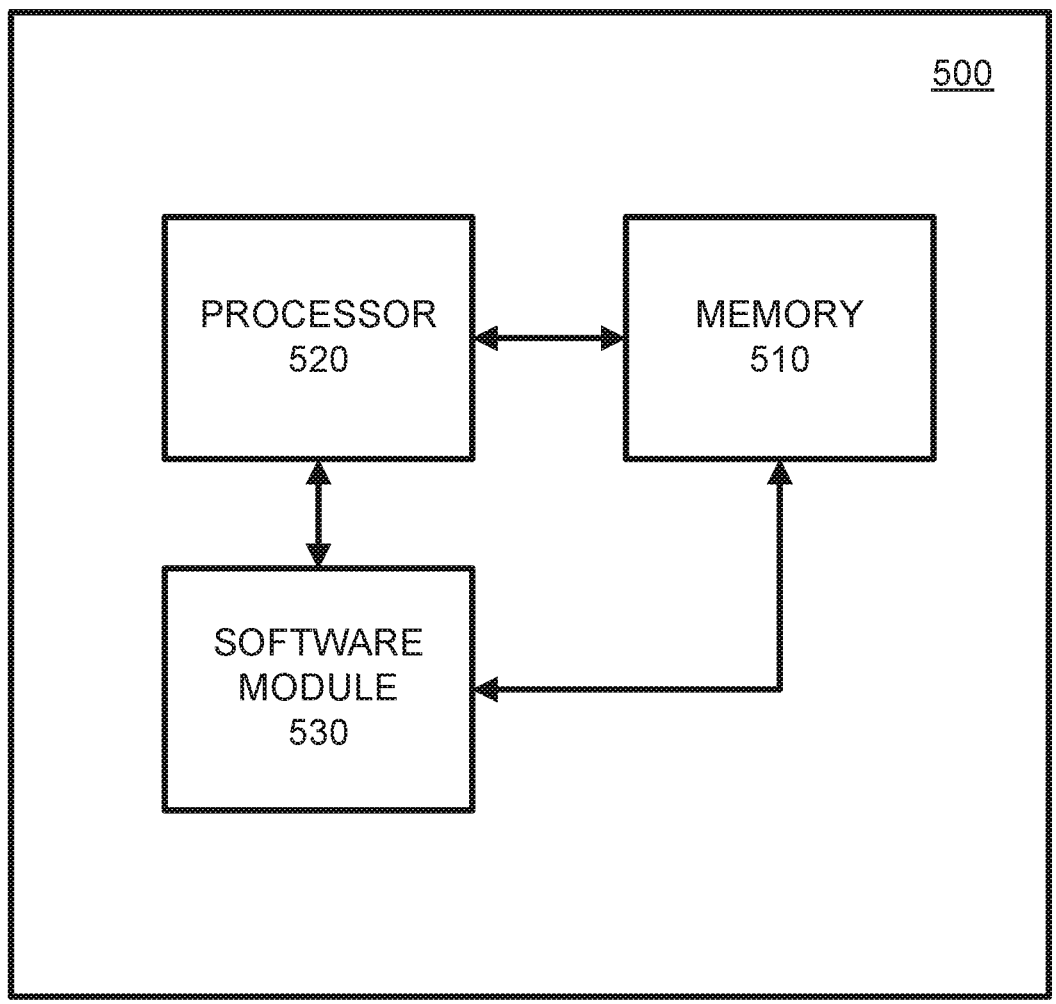
FIG. 5 illustrates an example network entity configured to support one or more of the example embodiments.

As illustrated in FIG. 5, a memory 510 and a processor 520 may be discrete components of a network entity 500 that are used to execute an application or set of operations as described herein. The application may be coded in software in a computer language understood by the processor 520, and stored in a computer readable medium, such as, a memory 510. The computer readable medium may be a non-transitory computer readable medium that includes tangible hardware components, such as memory, that can store software. Furthermore, a software module 530 may be another discrete entity that is part of the network entity 500, and which contains software instructions that may be executed by the processor 520 to effectuate one or more of the functions described herein. In addition to the above noted components of the network entity 500, the network entity 500 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed.

Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    monitoring a computing service via a plurality of nodes operating on a blockchain;
    identifying a proposed change to the computing service;
    storing details of the proposed change in a smart contract;
    storing the smart contract as a transaction in the blockchain; and
    validating the proposed change of the smart contract, wherein
    the plurality of nodes consider a longest chain to be a correct chain and keep working on extending the longest chain, and
    the blockchain stores references to an off-chain distributed hash-table storing actual data related to changes.

2. The method of claim 1, wherein the computing service is one or more of a cloud service, a network service, and a data center service.

3. The method of claim 1, wherein the details of the proposed change comprise all parties involved in the proposed change, conditions required to execute the proposed change, and items to be executed during the proposed change.

4. The method of claim 1, further comprising:
    executing the proposed change of the smart contract; and
    storing execution results of the smart contract in a distributed hash table that is separate from the blockchain.

5. The method of claim 4, further comprising:
    broadcasting the transaction to the plurality of nodes on the blockchain; and
    authorizing the proposed change via one or more of the plurality of nodes.

6. The method of claim 5, further comprising:
    creating one or more blocks with execution results of the proposed change of the smart contract; and
    broadcasting the execution results to the plurality of nodes.

7. The method of claim 6, further comprising:
    accepting the one or more blocks when the transaction is deemed valid.

8. An apparatus, comprising:
    a processor configured to:
        monitor a computing service via a plurality of nodes operating on a blockchain;
        identify a proposed change to the computing service;
        store details of the proposed change in a smart contract;
        store the smart contract as a transaction in the blockchain; and
        validate the proposed change of the smart contract, wherein
        each node of the plurality of nodes monitors respective information technology (IT) assets in an assigned sub-network that is assigned based on a sub-graph of a graph of an entire network.

9. The apparatus of claim 8, wherein the computing service is one or more of a cloud service, a network service, and a data center service.

10. The apparatus of claim 8, wherein the details of the proposed change comprise all parties involved in the proposed change, conditions required to execute the proposed change, and items to be executed during the proposed change.

11. The apparatus of claim 8, wherein the processor is further configured to:
    execute the proposed change of the smart contract; and
    store execution results of the smart contract in a distributed hash table that is separate from the blockchain.

12. The apparatus of claim 11, wherein the processor is further configured to:
    broadcast the transaction to the plurality of nodes on the blockchain; and
    authorize the proposed change via one or more of the plurality of nodes.

13. The apparatus of claim 12, wherein the processor is further configured to:
    create one or more blocks with execution results of the proposed change of the smart contract; and
    broadcast the execution results to the plurality of nodes.

14. The apparatus of claim 13, wherein the processor is further configured to:
    accept the one or more blocks when the transaction is deemed valid.

15. A non-transitory computer readable storage medium storing instructions that, when executed, cause a processor to perform:
    monitoring a computing service via a plurality of nodes operating on a blockchain;
    identifying a proposed change to the computing service;
    storing details of the proposed change in a smart contract;
    storing the smart contract as a transaction in the blockchain; and
    validating the proposed change of the smart contract, wherein
    each node of the plurality of nodes monitors respective information technology (IT) assets in an assigned sub-network that is assigned based on a sub-graph of a graph of an entire network.

16. The non-transitory computer readable storage medium of claim 15, wherein the computing service is one or more of a cloud service, a network service, and a data center service.

17. The non-transitory computer readable storage medium of claim 15, wherein the details of the proposed change comprise all parties involved in the proposed change, conditions required to execute the proposed change, and items to be executed during the proposed change.

18. The non-transitory computer readable storage medium of claim 15, wherein the instructions are further configured to cause the processor to perform:
    executing the proposed change of the smart contract; and
    storing execution results of the smart contract in a distributed hash table that is separate from the blockchain.

19. The non-transitory computer readable storage medium of claim 18, wherein the instructions are further configured to cause the processor to perform:
    broadcasting the transaction to the plurality of nodes on the blockchain; and
    authorizing the proposed change via one or more of the plurality of nodes.

20. The non-transitory computer readable storage medium of claim 19, wherein the instructions are further configured to cause the processor to perform:
- creating one or more blocks with execution results of the proposed change of the smart contract;
- broadcasting the execution results to the plurality of nodes; and
- accepting the one or more blocks when the transaction is deemed valid.

* * * * *